UNITED STATES PATENT OFFICE 2,616,894

SUBSTITUTED THIOUREAS AS DYESTUFF INTERMEDIATES

Henry G. Derbyshire, Johnson City, N. Y., assignor to General Aniline & Film Corporation, New York, N. Y., a corporation of Delaware No Drawing. Application December 16, 1949, Serial No. 133,472

6 Claims. (Cl. 260—305)

This invention relates to substituted thioureas which are of value as dyestuff intermediates.

The object of the present invention is to provide substituted thioureas as dyestuff intermediates for the synthesis of cyanine dyes capable of sensitizing gelatino silver halide emulsions.

Other objects and advantages of this invention will become apparent by reference to the following specification in which its preferred details and embodiments are described.

These and other objects are accomplished by heating a cyclammonium quaternary salt having a reactive amino group in the α- or γ-position to the quaternary nitrogen atom with an alkyl or aryl isothiocyanate in the presence of a basic condensing agent. The reaction takes place with the liberation of an acid and yields the thiourea derivative. The resulting product may be (1) alkylated with an alkyl or aralkyl ester, or (2) heated with an α-halogen acid, α-dihalogen acetic acid, or with an α-halogen propionic acid to yield thiazolone cyanine dyes with a nitrogen chain atom. The product obtained from the second reaction by treatment with α-halogen acetic acid may be further treated with a cyclammonium quaternary salt of the type commonly employed in cyanine dye synthesis to yield azatrinuclear cyanine dyes.

The reaction involved while utilizing an α- or γ-amino substituted cyclammonium quaternary salt and an alkyl or aryl isothiocyanate in the presence of a basic condensing agent is illustrated by the following equation:

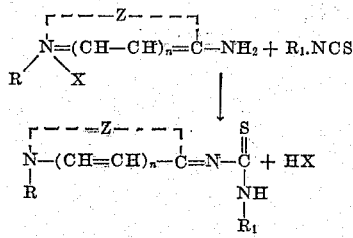

In the foregoing equation R represents an alkyl aryl, aralkyl, or substituted groups of this type, e. g., methyl, ethyl, propyl, butyl, hydroxymethyl, hydroxypropyl, hydroxybutyl, hydroxyethyl, ethoxymethyl, ethoxyethyl, ethoxypropyl, ethoxybutyl, phenyl, tolyl, naphthyl, benzyl, phenethyl, menaphthyl, and the like, $R_1$ represents a lower alkyl, e. g., methyl, ethyl, propyl, isopropyl, butyl, isobutyl, and the like, allyl, and aryl and aralkyl groups of the same value as in R, $n$ represents 0 or 1, X represents an acid radical, e. g., chloride, bromide, iodide, or alkyl sulfate, alkyl p-toluenesulfonate, or perchlorate, and Z represents the residue of a heterocyclic nitrogenous nucleus of the type used in cyanine dyes, e. g., oxazoles, thiazoles, selenazoles, and their polycyclic homologues, such as those of the benzene, naphthalene, acenaphthene, and anthracene series, pyridine, and its polycyclic homologues, such as quinoline and α- and β-naphthaquinolines, perinaphthiazoles, indolenines, diazines, such as pyrimidines, and quinazolines, diazoles (e. g., thio-β-β'-diazole), oxazolines, pyrrolines, thiazolones and selenazolines (the polycyclic compounds of these series being substituted if desired in the carbocyclic rings with one or more conventional groups, such as alkyl, or aryl, as below, amino, hydroxy, alkoxy, i. e., methoxy, ethoxy, etc., and methylenedioxy groups, or by halogen atoms, i. e., chlorine, bromine, etc.).

Any one of the known types of cyclammonium quaternary salts having the specific reactive amino group commonly employed for use in the manufacture of cyanine dyes may be employed in the process of the present invention. As representative examples of such salts, the following may be mentioned:

2-aminopyridine ethiodide
2-aminoquinoline methiodide
4-aminoquinoline ethiodide
2-aminothiazoline ethiodide
2-aminobenzothiazole methyl p-toluenesulfonate
2-aminobenzoselenazole methiodide
2-amino-5-methylbenzothiazole ethiodide
2-aminobenzoxazole ethyl p-toluenesulfonate
2-aminobenzoselenazole benzyl bromide
2-amino-β-naphthathiazole methyl methosulfate
2-amino-α-naphthathiazole ethyl iodide
2-amino-6-ethoxybenzothiazole methiodide
2-amino-3,3-dimethyl indolenine ethiodide
2-amino-4-methylthiazole methiodide
2-amino - 5,6 - cyclopentylidine-dioxy-benzthiazole-ethyl-p-toluenesulfonate
2-amino - 5,6 - dimethoxy-benzthiazole-ethyl-p-toluenesulfonate The following are examples of suitable alkyl, aryl and aralkyl isothiocyanates which may be condensed with the cyclammonium quaternary salts in the presence of a basic condensing agent:

methyl isothiocyanate
ethyl isothiocyanate
propyl isothiocyanate
isopropyl isothiocyanate
n-butyl isothiocyanate
allyl isothiocyanate
benzyl isothiocyanate
phenethyl isothiocyanate
phenyl isothiocyanate
p-tolyl isothiocyanate
o-tolyl isothiocyanate
p-chlorophenyl isothiocyanate The substituted thioureas are prepared by dissolving a molecular equivalent of a cyclammonium quaternary salt having the specified reactive amino group, and a slight excess of a molecular equivalent of an alkyl, aryl, or aralkyl isothiocyanate in a sufficient quantity of a heterocyclic nitrogenous base, such as pyridine, dimethylpyridine, ethylpyridine, ethylmethylpyridine, trimethylpyridine, quinoline, and the like. To this solution a small quantity of an organic base, such as an alkylamine, e. g., dimethylamine, diethylamine, trimethylamine, triethylamine, and the like, is added and the solution is heated either at the steam bath or reflux temperature for a period of time ranging from 15 minutes to 1 hour. The crystals which form during this time are filtered off, washed with alcohol, and dried.

The reaction product obtained may be alkylated by heating a molecular equivalent of the product with about ½ to 4 molecular equivalents of an alkyl or aralkyl ester usually employed in the cyanine dye art, such as, for example, dimethyl or diethyl sulfate, benzyl iodide, methyl p-toluenesulfonate, and the like, in a closed vessel at a temperature ranging from 120–160° C. from 2 to 6 hours. The reaction mixture is cooled, boiled with acetone, alcohol added, and the crystals precipitated with ether. The final product is purified by precipitation with ether from a methanol-acetone solution.

The following examples describe the preparation of some of the substituted thioureas. It is to be understood that the following examples are merely illustrative and that the invention is not to be regarded as restrictive thereto.

*Example I*

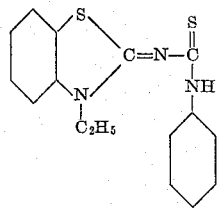

N-(3-ethyl-2-benzothiazolylidine)-N'-phenylthiourea 5.5 grams of 2-aminobenzothiazole ethiodide and 5 grams of phenyl isothiocyanate were dissolved in 10 mls. of hot pyridine. The solution was heated slowly until its temperature reached 130° C. Upon cooling to 25° C., a yellow solid crystallized which was filtered off, washed with water, dried, and purified by recrystallization from methanol. The product was dried at 85° C. 5.4 grams of a purified product were obtained which melted at 158° C.

*Example II*

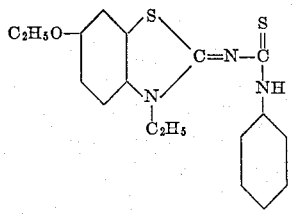

N-(3-ethyl-6-ethoxy-2-benzothiazolylidine-N'-phenylthiourea 8 grams of 2-amino-6-ethoxybenzothiazole ethiodide and 5 grams of phenyl isothiocyanate were dissolved in 10 mls. of boiling pyridine. The resulting solution was stirred and slowly heated to 150° C. while permitting the pyridine to distill off at this point. Heating was discontinued, but stirring was kept up until the reaction mass was cooled to 25° C. A yellowish solid separated which was washed with two 25 ml. portions of water, then triturated with 20 mls. of methanol and filtered. After consecutive washings with water and methanol, the solid was dried overnight at 80° C. 6 grams of a purified product were obtained which melted at 177–180° C.

*Example III*

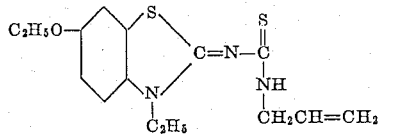

N-(3-ethyl-6-ethoxy-2-benzothiazolylidine)-N'-allylthiourea 7 grams of 2-amino-6-ethoxybenzothiazole ethiodide and 5 grams of allyl isothiocyanate were heated together in 5 mls. of boiling pyridine. Heating was continued until the internal temperature reached 150° C. The reaction mixture was cooled to room temperature and poured into 10 mls. of water. The yellow solid which separated was triturated with three fresh 10 ml. portions of methanol, filtered, washed alternately with water and methanol and dried. The purified product melted at 119–122° C.

*Example IV*

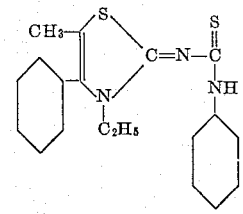

N-(3-ethyl-5-methyl-4-phenyl-2-thiazolylidine)-N'-phenylthiourea 6 grams of 2-amino-5-methyl-4-phenylthiazole ethiodide and 4 grams of phenyl isothiocyanate were dissolved in 10 mls. of hot pyridine. The resulting solution was heated until its internal temperature reached 140° C. The mixture was stirred slowly until cooled to 25° C. A solid separated which was diluted with 10 mls. of isopropyl alcohol, filtered, repeatedly washed with isopropyl alcohol and dried. 4.7 grams of a lemon-white solid were obtained which melted at 183–185° C.

*Example V*

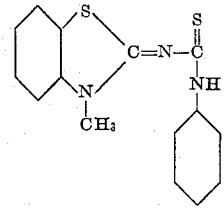

N-(3-methyl-2-benzothiazolylidine)-N'-phenylthiourea

This product was prepared from 5 grams of 2-aminobenzothiazole methiodide and 5 grams of phenyl isothiocyanate by following the procedure of Example I.

*Example VI*

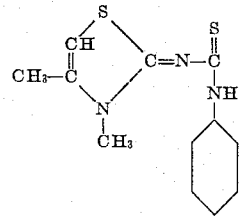

N-(3,4-dimethyl-2-thiazolylidine)-N'-phenylthiourea 100 grams of 2-amino-4-methylthiazole dimethylsulfate and 5.7 grams of phenyl isothiocyanate were heated slowly together until the temperature of the reaction mixture reached 140° C. At this point, heating was discontinued and the mass was stirred constantly until it reached room temperature. Crystals separated when the mass was diluted with a mixture of 200 mls. of equal parts of water and isopropanol. The crystals were filtered off, washed in isopropyl alcohol, and dried.

The substituted thioureas can also be prepared by reacting the amino-substituted cyclammonium quaternary salt with an alkyl N-phenyldithiocarbamate, such as methyl N-phenyldithiocarbamate or ethyl N-(p-tolyl)dithiocarbamate, as illustrated by the following example:

*Example VII*

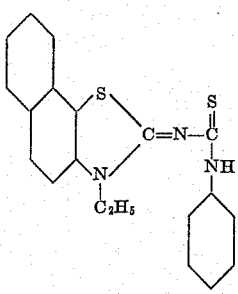

N-(3-ethyl-2-naphtho[2,1]thiazolylidine)-N'-phenyl-thiourea 9.2 grams of methyl N-phenyldithiocarbamate and 17.8 grams of 2-aminonaphtho[2,1]thiazole ethiodide were dissolved in 60 mls. of pyridine and heated to 145° C. Yellow crystals separated upon cooling, which were purified by alternate washings with water and methanol. The purified product melted at 203° C.

The dyestuff intermediates prepared according to the preceding examples may be utilized in the synthesis of various types of optical sensitizing dyes, such as trinuclear cyanine dyes, and the like.

I claim:

1. A substituted thiourea dyestuff intermediate characterized by the following formula:

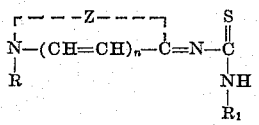

wherein R represents a member selected from the class consisting of alkyl, aryl, and aralkyl groups, $R_1$ represents a member selected from the class consisting of lower alkyl, allyl, aryl, and aralkyl groups, $n$ represents an integer of from 0 to 1, and Z represents the atoms necessary to complete a heterocyclic nitrogenous ring system.

2. A substituted thiourea dyestuff intermediate characterized by the following formula:

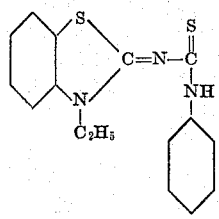

3. A substituted thiourea dyestuff intermediate characterized by the following formula:

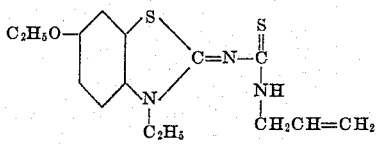

4. A substituted thiourea dyestuff intermediate characterized by the following formula:

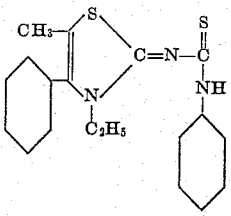

5. A substituted thiourea dyestuff intermediate characterized by the following formula:

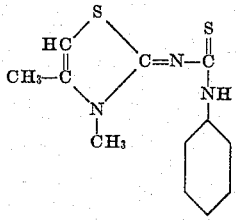

6. A substituted thiourea dyestuff intermediate characterized by the following formula:

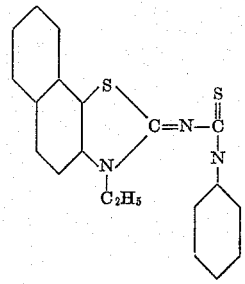

HENRY G. DERBYSHIRE.

REFERENCES CITED

The following references are of record in the file of this patent:

UNITED STATES PATENTS

| Number | Name | Date |
|---|---|---|
| 2,093,214 | Schrader et al. | Sept. 14, 1937 |
| 2,312,040 | Kendall et al. | Feb. 23, 1943 |
| 2,394,067 | Kendall et al. | Feb. 5, 1946 |
| 2,425,774 | Wilson | Aug. 19, 1947 |
| 2,464,785 | Thompson | Mar. 22, 1949 |
| 2,536,986 | Thompson | Jan. 2, 1951 |

OTHER REFERENCES

Schneider et al., Berichte, vol. 57, pages 522–532 (1924).